Dec. 25, 1923.

C. G. RENOLD

STENTER CHAIN

Filed Oct. 12, 1922      2 Sheets-Sheet 1

INVENTOR
Charles Garonne Renold
by his attorney
James Hamilton

Dec. 25, 1923.

C. G. RENOLD 1,478,454

STENTER CHAIN

Filed Oct. 12, 1922    2 Sheets-Sheet 2

INVENTOR
Charles Garonne Renold
by his attorney
James Hamilton

Patented Dec. 25, 1923.

1,478,454

UNITED STATES PATENT OFFICE.

CHARLES GARONNE RENOLD, OF MANCHESTER, ENGLAND, ASSIGNOR TO HANS RENOLD LIMITED, OF MANCHESTER, ENGLAND.

STENTER CHAIN.

Application filed October 12, 1922. Serial No. 594,225.

*To all whom it may concern:*

Be it known that I, CHARLES GARONNE RENOLD, a subject of the King of Great Britain, and resident of Burnage Works, Didsbury, Manchester, in the county of Lancaster, England, have invented certain new and useful Improvements in Stenter Chains (for which I have filed an application in England dated 7th March, 1922), of which the following is a specification.

This invention relates to stenter chains. It is the object of the invention to enable such chains to be made substantially lighter than has been possible with forms of such chains hitherto used while reducing the friction arising from their engagement with the guide rollers or channels as much as possible and consequently decreasing the power required to drive the stentering machines and enabling the stentering chains to be run at a higher linear speed. Various forms of stenter chains have been proposed previously furnished with rollers for facilitating the working of the chains in their guide tracks or to take the pull due to the weight of the fabric and the tension in the fabric which was being stentered. One object of the present invention is to provide a light and strong chain furnished with rollers so disposed that no matter in what direction the load, pull or thrust may act upon the chain at any moment, it is borne entirely by rollers.

According to the present invention, relatively light chains are made on the general lines usual in driving chains, that is to say, the inner links are joined in pairs by bushes through which studs or inner bushes are passed to connect the outer links in pairs. The links are formed with laterally projecting lugs bent out from the metal of the links and these lugs support rollers which either take up the lateral tension, or take up the weight of the chain and support any canting stresses on the chain according to the plane in which the pivotal axes of the chain links are arranged to move. The laterally projecting lugs may also serve for securing the stenter clips or pinned plates. The chain itself is then provided with rollers either on the projecting ends of studs passing through the inner bushes or on projecting ends of solid studs connecting the outer links. These rollers are arranged to operate in guide tracks and when the chain is arranged for the pivotal axes of the links to move in a horizontal plane, these rollers take the weight of the chain and any canting stresses on the chain. Such canting stresses may act in either direction owing to the pull of the fabric on the one hand and to the thrust on the other hand necessary to open the spring clip jaws when such are employed. When the chain is arranged with the pivotal axes vertical these latter rollers serve to bear the lateral stresses.

Some examples of stenter chains constructed in accordance with the present invention will now be more fully described with reference to the accompanying drawings in which:—

Figure 2 is a plan of an improved pin stenter chain; while

Figure 8:
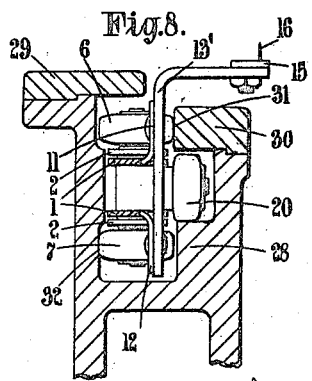

Figure 8 a cross section of a pin stenter chain with the link pivots arranged vertically.

Figure 1:
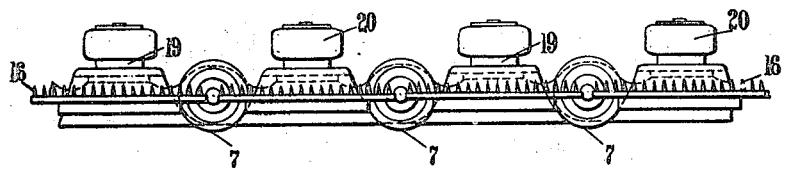
Figure 1 is a side elevation.
Figure 2:
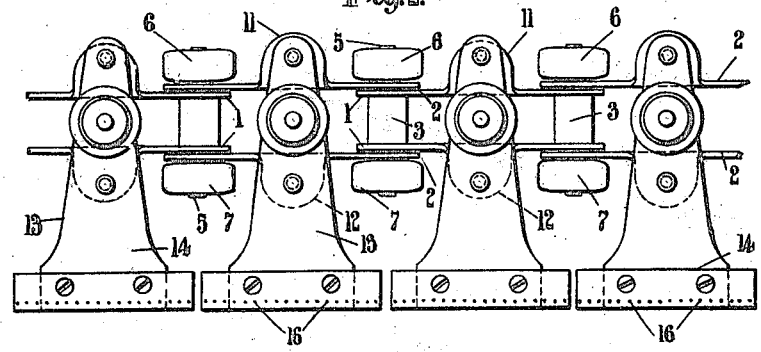
Figure 3:
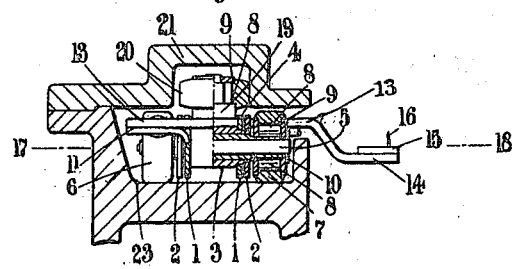
Figure 3 is a cross section through the upper guide track.

In the form illustrated in Figures 1 to 4, both the inner and outer links 1, 2, are joined by hollow bushes 3, 4. Studs 5 are then passed through the inner hollow bushes 4 and rollers 6, 7, are mounted upon the projecting ends of the studs 5. The rollers 6, 7, may be provided with ball bearings, or even plain bearings, but, as illustrated, in order to reduce the need of lubrication to a minimum they have roller bearings formed by the use of small pins or rollers 8 held laterally between washers 9 mounted on bushes 10. The link plates 1, 2, are formed in their middle portions with outwardly bent lugs 11, 12 and upon these lugs are riveted transverse plates 13 each of which at one end has a broadened extension 14, best seen in the lower part of Figure 2. The extensions 14 carry the pin plates 15, pins 16 of which serve to grip the fabric. The plates 13 are preferably bent downwardly at their ends 14, as seen in Figure 3, in order that the pins 16 may grip the fabric in the plane passing through the centre of the pivots of the chain links. This plane is indicated at 17, 18, in Figure 3. It may be noticed that by this means the chains can run over the chain wheels or drums at the end of the track whilst still holding the fabric to be stentered, with the result that the chain can be in engagement with the fabric to be stentered both along the upper track and the return track, thus speeding up the process by permitting the chains to be run at a faster rate, while the fabric is under tension for a greater length.

Each transverse plate 13 has a stud 19 projecting upwardly from it at the centre line of the chain and a roller 20 shown with roller bearings, as above described, is mounted on the stud 19 in order that it may run in an upper guide track 21 and in a lower guide track 22 in order to take up the principal lateral stresses. If desired, this roller may be furnished with ball bearings or even with a plain bearing.

Figure 4:
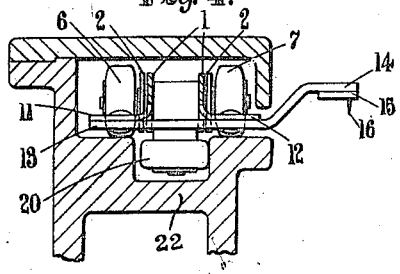
Figure 4 is a similar section through the return guide track.

As seen in Figure 3, the necessary guide track for such a chain has a channel 23 at the bottom in which the rollers 6, 7, work and, over this bottom channel, is an inverted top channel 21 as already described. The rollers 6 and 7 may leave the channel 23 when the chain is canted and come into contact with the top channel 21. There is, however, a clearance between these rollers and the top track when they are bearing on the bottom track and vice versa. It may be noted that the rollers 20 bearing in the groove in the upper member 21 have sufficient clearance, so that they only bear on one side of the groove at one time, but can bear on either side to take up pull in either direction. The transverse members 13 extend through a gap between the upper member 21 and the lower member 23, seen to the right of Figure 3, but this gap is sufficiently wide in order that the clearance allowed for the various rollers will not permit the member 13 to come into contact with either the bottom member 23 or the top member 21. It will be noted that the lower or return track is shown in Figure 4. This will not need separate description, however, as it is very similar to the upper guide track except that it is reversed in order to accommodate the rollers 20 in a groove in the lower member 22 of that return track.

With a chain made as illustrated in Figures 1 to 4 only rollers 6, 7 and 20 touch the guide surfaces, so that friction is reduced to a minimum without recourse to special or particular means of lubrication thus enabling the chain to be run at a higher speed and the chain is substantially lighter than the stentering chains hitherto in use having solid or block links, so that the power required to operate the stentering machine is materially reduced.

Figure 5:
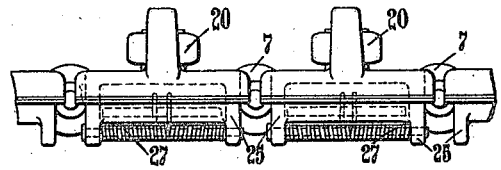
Figures 5 and 6 are side elevation and cross section through a stenter chain with spring clip, but with guiding arrangements similar to those in Figures 1 to 4.
Figure 6:
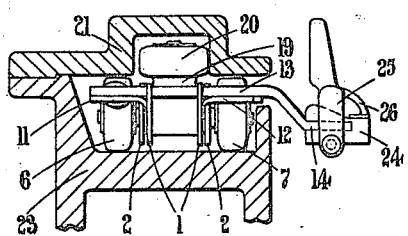

In the construction of a chain shown in Figures 5 and 6, the chain proper and its bearing rollers 6, 7, and 20 as well as the guide track 21, 23 are very similar in construction to those illustrated in Figures 1 to 3 and as corresponding reference characters have been applied it is not considered that a separate description is necessary. It may be remarked, however, that in this arrangement the stentering pins are replaced by spring stenter clips which comprise a base portion 24 to which are pivoted vertical ears 25 carrying a jaw 26. Each jaw 26 is pressed against the base portion 24 by means of a coiled spring 27 and the fabric to be dealt with is gripped between the jaw 26 and the base portion 24.

Figure 7:
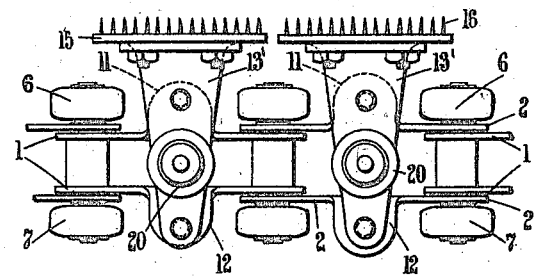
Figure 7 is a plan.

Although a chain constructed as above described is arranged to run with the axes of the chain pivots horizontal, it will be apparent that it can readily be adapted for use in cases where the chain is required to work with the axes of its links vertical. Such a construction is illustrated in Figures 7 and 8. In the main, the construction is the same as that illustrated in Figures 1 to 4 and corresponding reference characters have been applied. It should be noted, however, that the transverse members 13' carrying the pinplates 15 are shaped so as to extend sideways above the chain, as clearly seen to the right of Figure 8. The guide track is of somewhat different construction and is made in three parts 28, 29, 30, as shown in Figure 8. The rollers 6, 7, in the vertical construction do not both bear simultaneously on one side of the guide track, but, as shown, the roller 6 is bearing on the right-hand side of the guide track at the point 31 and the roller 7 is bearing on the left hand side of the guide track at the point 32, which will be the normal position when the fabric is pulling upon the pins 16. Should the chain become canted, however, the roller 6 will bear on the left hand side of the guide track and the roller 7 on the right hand side. In this case, of course, it is not the rollers 6 and 7 which sustain the weight of the chain, but the roller 20. The chain links in all of the above constructions may be made from sheet metal by methods usually adopted in the manufacture of driving chain links from strips of such metal. The lugs 11, 12 and so forth on the links are bent out therefrom after the link blanks have been punched out from the strip.

The invention is not strictly limited to the forms of construction illustrated but is capable of some modification, for example, instead of using hollow bushes and studs for connecting the links together and passing solid studs through the hollow studs to carry the rollers on either side, the outer links of the chain may be themselves connected together by solid studs and then the side rollers will be mounted on an extension of such studs.

Having thus described my invention what I claim as new and desire to secure by Letters Patent is:—

1. A stenter chain comprising inner links arranged in pairs, tubular bushes connecting each pair of said inner links adjacent both ends thereof, outer links arranged in pairs, studs passing through and fitting pivotally within said bushes and connecting the pairs of outer links adjacent the ends thereof, spaced rollers carried by said chain at either side thereof outside the outer link pairs and so disposed that the running surfaces of the rollers are free from obstruction both above and below the chain, additional spaced rollers and means for supporting them upon the chain with their axes at right angles to the pivoting axes of the connections between the links, said last named rollers being so disposed in relation to the chain that their running surfaces at both sides of the chain are free from obstruction.

2. A stenter chain comprising link plates with means pivotally connecting together said link plates, rollers spaced apart along said link plates and means revolubly supporting the same upon the chain in such a manner that said rollers are disposed at both sides of the chain on axes parallel with the pivotal connections of said link plates, while the running surfaces of said rollers above and below the chain are freely exposed for running on guide surfaces at either side thereof, additional spaced rollers and means revolubly supporting them on said link plates upon axes at right-angles to the axes of the pivotal connections between said link plates, said last mentioned rollers having their running surfaces freely exposed at both sides of the chain for running upon guide surfaces extending at either side thereof.

3. A stenter chain comprising inner links arranged in pairs, tubular bushes connecting each of said pairs adjacent the ends thereof, outer links arranged in pairs, studs passing through and fitting within said bushes and connecting each pair of said outer links adjacent the ends thereof, rollers carried by the ends of said studs external to said pairs of links for taking up stresses at right angles to the axes of said studs, said rollers having their running surfaces freely exposed for opperating upon guide surfaces both above and below the same, and further rollers with means for supporting the same in spaced positions along the chain, said further rollers being adapted to sustain pulls and thrusts parallel to the axes of said bushes and studs, and having their running surfaces freely exposed for operating upon guide surfaces at either side thereof.

4. A stenter chain comprising inner links arranged in pairs, tubular bushes connecting together each pair of said inner links, outer links arranged in pairs, tubular studs passing through and fitting within said bushes, connecting together the pairs of said outer links and pivotally connecting adjacent pairs of inner and outer links, two sets of rollers carried by said chain for sustaining respectively pulls and thrusts parallel to the axes of said studs, and pulls and thrusts at right angles to said axes, all of said rollers having their running faces freely exposed in such manner as to operate upon guide tracks at either side thereof.

5. A stenter chain comprising inner links formed with laterally projecting lugs bent to extend outwardly from the middle of said inner links, tubular bushes uniting said inner links in pairs, outer links formed with laterally projecting lugs also bent to extend outwardly from the middle of said outer links, studs fitting within said tubular bushes connecting together said outer links in pairs and serving to connect pivotally adjacent pairs of said inner and outer links, connecting plates each rigidly secured to an opposite pair of said projecting lugs so as to extend completely across the chain, spaced rollers for sustaining stresses parallel to the pivotal axes of said links supported upon said connecting plates and further spaced rollers with means for supporting the same at each side of the outer links of the chain, all of said rollers having their running faces freely exposed in such manner as to operate upon guide tracks at either side thereof.

6. A stenter chain comprising inner links formed with laterally projecting lugs bent out from the middle of said inner links, tubular bushes uniting said inner links in pairs, outer links formed with laterally projecting lugs bent out from the middle of said outer links, studs fitting within said bushes connecting together said outer links in pairs and serving to connect pivotally adjacent pairs of said inner and outer links, guide rollers carried by said studs at each side of the chain and with their upper and lower running faces freely exposed, connecting plates rigidly secured to projecting lugs bent out from opposite links of the chain so as to extend completely across the chain, additional guide rollers having pivots carried by said connecting plates supporting said rollers in such manner that their running surfaces are freely exposed at both sides of the chain, and means carried by said connecting plates for engaging the fabric to be stentered.

7. A stenter chain comprising inner links formed with laterally projecting lugs bent out from the metal of said inner links, plates each rigidly secured to said laterally projecting lugs, bushes uniting said inner links in pairs, outer links formed with laterally projecting lugs bent out from the metal of said outer links, a second set of plates rigidly secured to said laterally projecting lugs from said outer links, studs connecting together said outer links in pairs and co-operating with said bushes to connect pivotally adjacent pairs of said inner and outer links, and guide rollers mounted upon both of said sets of plates with their pivotal axes at right angles to the pivotal axes of said inner and outer links, and means for engaging the fabric to be stentered carried by said two sets of plates.

8. In a stentering machine for textile fabrics, the combination of a chain comprising inner links and outer links with means pivotally connecting the same together, pairs of rollers and means supporting them in spaced positions along the chain at the pivoting connections between said links, and with their axes parallel to the pivoting axes of said links, said rollers being arranged so that their surfaces at both sides are free to run on guide tracks, additional rollers with means for supporting the same upon the links on axes at right angles to the pivoting axes of said links, said additional rollers being so disposed as to present running surfaces on both sides adapted to run between guide surfaces, and guide tracks arranged for engagement by all of the said rollers, said guide tracks presenting faces with clearances between which all of the said rollers can run, the clearances being such that no matter in what direction the chain may be pulled, pushed or canted, no part of the chain other than the rollers aforesaid can bear upon the guide tracks.

9. In a stentering machine for textile fabrics, the combination of a chain comprising outer links, studs connecting together said outer links in pairs, inner links and bushes connecting said inner links in pairs and fitting said studs, with pairs of rollers mounted on said studs with their axes parallel to the pivotal axes of said link pairs, guide tracks arranged for engagement by said rollers on opposite sides of the latter, but with a clearance such that either roller of a pair may bear only on one side or the other of said guide tracks at any one time, spaced rollers mounted on said links with their axes at right angles to the axes of said links and a guide track whose opposite faces are arranged to be engaged by said last-named rollers on opposite sides of the latter, the faces of said last-named guide track leaving a clearance such that said last-named rollers may engage only one of said faces at a time.

10. In a stentering machine for textile fabrics, the combination comprising outer and inner pairs of links, bushes connecting said inner link pairs and studs passing through said bushes connecting said outer link pairs, pairs of rollers and means revolubly supporting the same one at each side of the pivoting axes of connection of said outer and inner link pairs, spaced rollers and means revolubly supporting the same upon said link pairs, with their axes at right angles to those of the pivotal connections of said link pairs, means for engagement with the fabric to be stentered carried by said links, and guide tracks for said chain, said guide tracks having pairs of opposed faces between which said rollers work with a clearance between opposite faces thereof, said rollers and guide tracks being disposed relatively to one another in such manner that no matter in which direction the chain may be pulled, pushed or canted, the rollers alone will bear upon the guide tracks without any other element of the chain touching any part of said guide tracks.

CHARLES GARONNE RENOLD.